Patented May 28, 1935

2,003,208

UNITED STATES PATENT OFFICE 2,003,208

PROCESS FOR MAKING MAGNESIUM CARBONATE

Walter Hoge MacIntire, Knoxville, Tenn., assignor to American Zinc, Lead & Smelting Company, St. Louis, Mo., a corporation of Maine No Drawing. Application July 12, 1932,
Serial No. 622,169

7 Claims. (Cl. 23—67)

This invention relates to a process for making magnesium carbonate and more particularly a very light hydrated basic magnesium carbonate, and to the resulting product.

In the manufacture of precipitated magnesium carbonate on a commercial scale, the established method has been to treat burned dolomite with carbonated water, to separate the calcium carbonate precipitate from the solution, and then to heat the solution whereby precipitated basic magnesium carbonate is thrown down. This process is rather long and does not provide a product of the fineness desired for many purposes. It has also been proposed to manufacture basic magnesium carbonates in small quantities for pharmaceutical purposes by a reaction between magnesium oxide and ammonium carbonate. In this latter process, magnesium oxide is suspended in water and the necessary quantity of ammonium carbonate is added thereto under conditions such as to provide a full reaction between the magnesium oxide and the ammonium carbonate. In other words, the ammonium carbonate has been added in such quantity as to provide the amount of $CO_2$ necessary for combination with the magnesia in the formation of magnesium carbonate, the quantity of ammonia therefore being the theoretical amount required to combine with this necessary amount of $CO_2$ in the form of ammonium carbonate. Therefore relatively large quantities of ammonia have been required and moreover, the time required for the reaction to take place has been excessive, so that the method has never been practicable for the manufacture of basic magnesium carbonate in bulk on a commercial scale.

One of the objects of the present invention is to provide a novel process whereby hydrated magnesium carbonate can be made in bulk on a commercial scale, the product being in very finely divided form and the process being economical in time, materials and labor.

Another object is to provide a process for making magnesium carbonate wherein a reaction between magnesium oxide or magnesium hydroxide and carbon dioxide is effected with the use of ammonia gas in quantities materially less than those required when ammonium carbonate is used, the ammonia gas being used in a cyclical process and acting substantially like a catalytic agent.

Another object is to provide a process for making magnesium carbonate wherein the carbonate is formed by reaction between magnesium oxide or magnesium hydroxide, carbon dioxide and ammonia gas, the time required for the reaction to take place being materially less than the time heretofore required to carry out the reaction between magnesium oxide and ammonium carbonate.

A further object is to produce hydrated basic magnesium carbonate in a lighter and fluffier form than products produced by the established methods for producing hydrated magnesium carbonate in bulk. Other objects will appear more fully hereinafter.

The starting materials which can be employed for the present process include both magnesium oxide and magnesium hydroxide and may be obtained from any suitable source. The process is described hereinafter with specific reference to magnesium oxide, but the description will be understood to include also magnesium hydroxide.

The magnesium oxide employed may be either of the light or of the heavy type and is first suspended in water into which suspension carbon dioxide and ammonia gas are introduced as described more fully hereinafter. While the proportions of magnesium oxide and water may vary considerably, the ratio of 10 parts of magnesium oxide to 150 parts of water has been found preferable. Satisfactory results have however been obtained with proportions varying between the ratios of one part of magnesium oxide to ten parts of water and one part of magnesium oxide to thirty parts of water.

The suspension of magnesium oxide in water is preferably placed in a suitable closed system to prevent the loss and enable the recovery of the ammonia, and ammonia gas is introduced into the suspension, preferably in the proportion of about one part of ammonia gas to ten parts of solid. After the introduction of the ammonia gas, the mix is stirred vigorously and carbon dioxide gas is introduced until the suspension is transformed into a gel or "set". Preferably the influx of carbon dioxide gas is so controlled as to give a pressure not exceeding approximately one-fifth of an atmosphere above normal atmospheric pressure.

The transition from the milky suspension to the gel or set material takes place very rapidly following a preliminary period during which little physical change takes place in the consistency of the suspension. The period of agitation is determined by the readily observable thickening of the mix, and in practice an agitation period of approximately twenty minutes has been found sufficient. As soon as the thickening of the mix is observed, the influx of carbon dioxide gas is stopped and agitation discontinued after which a firm set quickly takes place. The mass will be found solidified substantially without supernatant liquid and the mass or cake may then be dried in any suitable way but preferably in a closed system with reduced pressure in order to effect a removal of moisture and a recovery of ammonia gas. The dried mass may then be cut into blocks of desired sizes or reduced to powder form, etc.

By carrying out the process in a closed rather than in an open system, and limiting the pressure therein as indicated, the time required to complete the operation is reduced by about one third, the product is increased by approximately 10%, and is of a greatly decreased apparent density. Moreover, the use of a closed system results not only in a conservation of the ammonia and $CO_2$ gases but also in the ability to regulate the speed of injection of the $CO_2$ gas. This is important, since if the $CO_2$ gas is passed through the suspension of magnesia too rapidly, full reaction would not be obtained. In a closed system the maintenance of the built-up pressure of 1⅕ atmosphere insures an optimal speed of $CO_2$ gas assimilation by the MgO suspension. While a built-up pressure of 1⅕ atmosphere has been found to be the optimal value for a continuous operation at a satisfactory speed, it will be understood that this pressure may be varied within limits without departing from the principle involved.

It will be observed that the amount of ammonia gas added to the mix is materially less than the amount of ammonia which would be added if a full reaction were carried out between magnesium oxide and ammonium carbonate added as a solid salt. To initiate the reaction, the amount of ammonia added is preferably about 23% of the amount that would be present if the reaction were effected by adding the ammonia and carbon dioxide in combination as ammonium carbonate. As each unit of magnesium oxide is converted into basic magnesium carbonate, a quantity of ammonia is liberated in the mix which quantity reenters into the reaction under the conditions described above. Thus the process is one in which the minimum amount of ammonia used is involved in a cyclical process of precipitation and solution to such an extent that the continuously used ammonia may be considered practically as a catalytic or carrier agent.

As a specific example of the process discussed generally above, ten parts of magnesium oxide of either the light or heavy type are suspended in 150 parts of water in a closed system, whereupon one part of ammonia gas is introduced into the mix. The mix is then vigorously agitated and carbonic acid gas is run into the suspension without permitting the pressure to exceed approximately one-fifth of an atmosphere above normal atmospheric pressure. After about twenty minutes, the mix will be observed to thicken whereupon influx of carbonic acid gas and agitation are discontinued. The mass sets quickly and may then be treated for the recovery of ammonia and removal of moisture as described above. The hydrated magnesium carbonate obtained in this way has an apparent density of about .10 to .12 as compared with the commercially accepted standard of .15. Moreover, the process is carried out in considerably less time than has been required heretofore for the preparation of magnesium carbonate, either by effecting a reaction between magnesium oxide and ammonium carbonate or by the usual procedure described above for making magnesium carbonate in bulk on a commercial scale. Furthermore, the process requires the use of a minimum amount of ammonia and results in a product of less apparent density and a greater product yield.

By varying somewhat the method of adding carbonic acid gas to the mix, the resulting product becomes extremely light and fluffy and consistently shows an apparent density of .06 to .07. This may be accomplished by adding the carbonic acid gas intermittently rather than continuously as described above. For example, carbonic acid gas is introduced into the mix of magnesium oxide water and ammonia gas until a pressure of about one-fifth of an atmosphere above normal atmospheric pressure is built up in the closed container. The influx of carbonic acid gas is then discontinued until normal atmospheric pressure is indicated in the agitated mix. The influx of carbonic acid gas is then intermittently repeated until the thickening of the mass indicates the completion of the reaction as in the case of continuous influx of carbonic acid gas. The time required to carry out the process involving intermittent influx of $CO_2$ is about double that required when $CO_2$ is added continuously and may be stated as about forty minutes. The subsequent treatment of the mass in the case of intermittent addition of $CO_2$ may be the same as described above in connection with the continuous addition of $CO_2$.

While the appended claims refer to magnesium oxide, it is the intent, and it is to be understood, that this expression also includes magnesium hydroxide, either material being obtained from any suitable source. It will also be understood that the invention is not restricted to the specific examples given and that the proportions of the various elements and the details of the process may be varied within the limits indicated above or otherwise as will be apparent to those skilled in the art. Reference is therefore to be had to the appended claims for a definition of the limits of the invention.

What is claimed is:

1. A process for making magnesium carbonate which consists in suspending magnesium oxide in water, adding ammonia gas to the suspension, then continuously adding carbon dioxide thereto, and continuing the addition of carbon dioxide until the mix begins to thicken, the quantity of ammonia being approximately 10% by weight of the magnesium oxide.

2. A process for making magnesium carbonate which consists in suspending magnesium oxide in water, adding ammonia gas to the suspension, and then intermittently adding carbon dioxide thereto until the mass begins to thicken, the quantity of ammonia being substantially less than the quantity theoretically required if the ammonia and carbon dioxide were added in the form of ammonium carbonate.

3. A process for making magnesium carbonate which consists in suspending magnesium oxide in water, adding ammonia gas to the suspension in a closed system, then adding carbon dioxide until the pressure in the system approximates one-fifth of an atmosphere above normal atmospheric pressure, then discontinuing the addition of carbon dioxide until normal atmospheric pressure is reached in the mix, and intermittently repeating such addition of carbon dioxide until the mix begins to thicken.

4. A process of making magnesium carbonate which consists in suspending magnesium oxide in water, adding ammonia gas to the suspension in the approximate proportion of one part of ammonia gas to ten parts of magnesium oxide, and then adding carbon dioxide gas thereto until the mix begins to thicken.

5. A process of making magnesium carbonate which consists in suspending magnesium oxide in water, adding ammonia gas to the suspension in the approximate proportion of one part of ammonia to ten parts of magnesium oxide, and then intermittently adding carbon dioxide thereto until the mix begins to thicken.

6. A process for making magnesium carbonate which consists in suspending magnesium oxide in water, adding ammonia gas to the suspension in the approximate proportion of one part of ammonia to ten parts of magnesium oxide, then agitating the mix in a closed system and then adding carbon dioxide thereto while limiting the pressure in said system to approximately one-fifth of an atmosphere above normal atmospheric pressure, and continuing the addition of carbon dioxide until the mix begins to thicken.

7. A process for making magnesium carbonate which consists in suspending magnesium oxide in water, adding ammonia gas to the suspension in the approximate proportion of one part of ammonia to ten parts of magnesium oxide, then agitating the mix in a closed system and adding carbon dioxide thereto until the pressure in said system approximates one-fifth of an atmosphere above normal atmospheric pressure, then discontinuing the addition of carbon dioxide until normal atmospheric pressure is reached in the mix, and repeating such intermittent additions of carbon dioxide until the mix begins to thicken.

WALTER HOGE MacINTIRE.